US012577512B2

(12) United States Patent
Tessiot

(10) Patent No.: US 12,577,512 B2
(45) Date of Patent: Mar. 17, 2026

(54) FERMENTED BEVERAGE AND METHOD OF PRODUCING A FERMENTED BEVERAGE

(71) Applicant: Heineken Supply Chain B.V., Amsterdam (NL)

(72) Inventor: Sabine Charlette Jacqueline Tessiot, Amsterdam (NL)

(73) Assignee: Heineken Supply Chain B.V., Amsterdam (NL)

( * ) Notice: Subject to any disclaimer, the term of this patent is extended or adjusted under 35 U.S.C. 154(b) by 597 days.

(21) Appl. No.: 17/600,343

(22) PCT Filed: Apr. 6, 2020

(86) PCT No.: PCT/NL2020/050234
§ 371 (c)(1),
(2) Date: Sep. 30, 2021

(87) PCT Pub. No.: WO2020/204722
PCT Pub. Date: Oct. 8, 2020

(65) Prior Publication Data
US 2022/0169959 A1 Jun. 2, 2022

(30) Foreign Application Priority Data
Apr. 4, 2019 (EP) ..................................... 19167431

(51) Int. Cl.
*C12C 12/04* (2006.01)
*C12C 5/02* (2006.01)

(52) U.S. Cl.
CPC .............. *C12C 12/04* (2013.01); *C12C 5/026* (2013.01)

(58) Field of Classification Search
CPC .. C12G 3/06; C12G 3/025; C12G 3/08; C12C 12/04; C12C 5/026
See application file for complete search history.

(56) References Cited

U.S. PATENT DOCUMENTS

2009/0285965 A1 * 11/2009 Liu ........................ A23L 33/185
426/590
2015/0017280 A1 * 1/2015 Vanderhaegen ........ C12C 5/026
426/534
2020/0032180 A1 * 1/2020 Shinkai ..................... C12C 7/00

FOREIGN PATENT DOCUMENTS

| CN | 104220585 A | 12/2014 |
|---|---|---|
| JP | 2013-201976 A | 10/2013 |
| JP | 2015027309 | 2/2015 |
| JP | 2018-57350 A | 4/2018 |
| JP | 2018050571 A | 4/2018 |
| JP | 2018057350 A | 4/2018 |
| JP | 2018-531601 A | 11/2018 |

| WO | 2011158395 A1 | 12/2011 |
|---|---|---|
| WO | WO-2018061370 A1 * | 4/2018 | ............... C12C 5/02 |
| WO | 2019026490 A1 | 2/2019 |

OTHER PUBLICATIONS

Jackowski et al Noon-Alcoholic Beer Production—an Overview https://intapi.sciendo.com/pdf/10.2478/pjct-2018-0051 (Year: 2018).*
https://onlinelibrary.wiley.com/doi/epdf/10.1002/j.2050-0416.1946. tb01579.x Jeliner (Top and Bottom Fermentation Systems and Their Respectibe Beer Characteristics) Journal of the Institute of Brewingvol. 52, Issue 4Jul. 1946pp. 155-189 (Year: 1946).*
https://patents.google.com/patent/JP2018057350A/en?oq= JP2018057350 (Year: 2018).*
Mcmurrough, et al., "Control of Ferulic Acid and 4-Vinyl Guaiacol in Brewing", J. Inst. Brew., Sep.-Oct. 1996, vol. 102, pp. 327-332.
Kumada, "Chapter 5 Fermented aroma ingredients", Nihon Shozo Kyokai Shi, vol. 71, No. 11, 1976, pp. 819-830.
Kishimoto, "The Aroma of Beer: Unraveling Its 'Structure' Reconstruction of beer aroma with 76 ingredients", Chemistry and Biology, vol. 56, No. 10, 2018, pp. 659-664.
Branyik et al., "A review of methods of low alcohol and alcohol-free beer production," Journal of Food Engineering, 2012, 14 pages.
Mangindaan et al., "Beverage dealcoholization processes: Past, present, and future," Trends in Food Science & Technology, 2018, 10 pages.
Sterckx, Femke L., et al. "Contribution of monophenols to beer flavour based on flavour thesholds, interactions and recombination experiments." Food Chemistry. vol. 126. Dec. 12, 2010. pp. 1679-1685.
Tokita, Keita, et al. "A New Method for Analyzing the Characteristic Flavor of Beer Using Selectable One-Dimensional or Two-Dimensional Gas Chromatography-Olfactometry/Mass Spectrometry." Journal of the American Society of Brewing Chemists. vol. 72, No. 2. Feb. 5, 2018. pp. 154-161.
Muller, Magdalena, et al. "Physical Methods for Dealcoholization of Beverage Matrices and their Impact on Quality Attributes." ChemBioEng Review. vol. 4, No. 5. Jul. 3, 2017. pp. 310-326.
International Search Report for International Application No. PCT/ NL2020/050234 dated Jul. 3, 2020, 3 pages.
Charles W. Bamforth: "Beer a quality perspective", In: "Whisky", Jan. 1, 2003 (Jan. 1, 2003), Elsevier, XP093152834, pp. 1-287, DOI: 10.1016/6978-012669202-0/50014-2.
Fujiwara, Yoshinori. Beer Flavor. 2004, No. 223, pp. 145-153.

(Continued)

*Primary Examiner* — Vera Stulii
(74) *Attorney, Agent, or Firm* — Banner & Witcoff, Ltd.

(57) ABSTRACT

The invention relates to a fermented beverage as well as a method of producing a fermented beverage, particularly a beer or beer-like beverage, with an ethanol content of between 0.0% and 1.0% by volume, the method comprising providing an ethanol containing fermented base beverage, reducing the ethanol content of the fermented base beverage by a de-alcoholisation step, followed by adding flavor to the fermented base beverage with reduced ethanol content to produce the fermented beverage, wherein the added flavor includes at least an amount of 4-vinyl guaiacol (4VG).

13 Claims, No Drawings

(56)         References Cited

OTHER PUBLICATIONS

Dictionary of brewed and fermented foods, published Jan. 15, 2002, pp. 71-83.
Lentz, Michael. The impact of simple phenolic compounds on beer aroma and flavor. In: Fermentation, vol. 4, No. 1, 20 (2018).

* cited by examiner

FERMENTED BEVERAGE AND METHOD OF PRODUCING A FERMENTED BEVERAGE

The present invention relates to the production of zero- or low alcohol beverages, particularly a beer or beer-like beverage, having desirable flavor. More particularly, the present invention provides a method of producing a fermented beverage with an ethanol content of between 0.0% and 1.0% by volume and having well recognizable 'spicy' and/or 'fruity' flavor notes. The invention further relates to a non-alcoholic or low-alcoholic fermented beverage, particularly a beer or a beer-like beverage, having a special flavor profile with off-flavor notes reduced and/or minimized, which renders the beverage more drinkable and enjoyable. The invention also relates to a concentrated flavor composition for use in producing a fermented beverage.

BACKGROUND

Fermented beverages having low or zero alcohol content are generally produced either by a method which limits alcohol formation during fermentation, i.e. by means of an adapted fermentation ("restricted alcohol fermentation") or by de-alcoholisation of an alcohol-containing base beverage obtained after fermentation.

Restricted alcohol fermentation, such as cold contact fermentation, is a process wherein the base beverage is fermented under conditions where there is little or no ethanol formation resulting in a zero- or low alcohol (ethanol) beverage. A drawback of restricted fermentation is that not only the ethanol formation is limited but also the ability of yeast to consume (convert) compounds in the base beverage known to be associated with undesirable or off-flavor notes. For example low or zero alcohol beverages produced with restricted fermentation, e.g. cold contact fermented beer, may suffer from undesirable high quantities of aldehydes and a lack of drinkability.

De-alcoholisation on the other hand is performed on a regularly fermented base beverage, and is designed to remove ethanol formed during fermentation. De-alcoholisation may be achieved by for instance rectification, reverse osmosis or dialysis of regular beer (see for general methodology Mangindaan et al., Trends in Food Science and Technology 71 (2018), 36-45; or Brányik et al, J. Food Eng. 108 (2012), 493-506). In contrast with restricted alcohol fermentation de-alcoholisation allows for an unrestricted fermentation, in which undesirable compounds in the base beverage may be consumed by the yeast to render the produced beverage having lower to no amounts of such undesirable compounds. However, it is difficult to prevent flavor deprivation upon de-alcoholisation of the beverage. Consequently, de-alcoholised beverages may have a 'flat' flavor, i.e. low in sensory odor and taste when consumed. This may be corrected by addition of flavor (taste and odor) compounds to the base beverage in order to obtain an acceptable beverage. It is however far from easy to obtain an agreeable taste by the addition of flavor after de-alcoholisation due to the flavor of a beverage being the result of a complex and delicate balance between the constituents of the beverage, amongst others the quantity and type of various sugars, esters, aldehydes, as well as the quantity of alcohols, particularly ethanol. In addition, the presence of alcohol, particularly ethanol, suppresses some taste attributes, and enhances others. Therefore, the taste of regular (alcohol-containing) fermented beverage, particularly a beer or beer-like beverage, cannot simply be mimicked by introducing all compounds responsible for flavor in identical quantities, in a non-alcohol beverage (see Brányik et al, cited above). A drawback of producing a de-alcoholised and subsequently flavored fermented beverage is thus that it is challenging to find desirable flavors and correct quantities of such desirable flavors to add to obtain an agreeable taste for a de-alcoholised and subsequently flavored fermented beverage.

The present invention provides a method to overcome the described drawbacks of producing a fermented beverage having low or zero alcohol content.

SUMMARY OF THE INVENTION

The present invention is concerned with a method of producing a fermented beverage, particularly a beer or beer-like beverage, with an ethanol content of between 0.0% and 1.0% by volume, comprising providing an ethanol containing fermented base beverage, reducing the ethanol content of the fermented base beverage by a de-alcoholisation step, followed by adding flavor to the fermented base beverage with reduced ethanol content to produce the fermented beverage, wherein the added flavor includes at least an amount of 4-Vinyl Guaiacol (4VG).

4VG is an aromatic, monomeric phenol that is formed by enzymatic or thermal decomposition of ferulic acid. In fermented beverages such as beer 4VG is produced by yeasts with a phenolic off-flavor (POF) phenotype by converting ferulic acid derived from the husk of barley malt. 4VG is present in many known alcoholic beers, although usually in an amount well below its flavor threshold value such that it is undetectable in taste. When present in a beverage in amounts above the flavor threshold value 4VG may become detectable in taste. For example in some beverages, as for instance in some specialty Belgian beers, 4VG imparts a pungent, spicy flavor in the form of clove-like notes to the beer. However in most beers and other fermented beverages noticeable amounts of 4G presents as an undesirable medicinal, off-flavor note. Accordingly, in the production of many known fermented beverages the amount of 4VG in the final beverage is controlled either by limiting the formation of 4VG during fermentation or by reducing the amount of 4VG in the final beverage by filtration or any other suitable method. In fermented beverages having low or zero alcohol content the levels of 4VG are generally well below the flavor threshold value as a result of either restricted fermentation or a de-alcoholisation step, respectively limiting formation of 4VG and reducing the amount of 4VG in the beverage.

It was surprisingly found that actually increasing the amount of 4VG in a de-alcoholised fermented base beverage having low or zero alcohol content provides a desirable flavor to the resulting zero- or low alcohol fermented beverage. Thus, addition of 4VG to a de-alcoholised fermented base beverage results in an improved final zero- or low alcohol fermented beverage, and particularly prevents the 'flat' flavor and gives well recognizable 'spicy' flavor notes to the final beverage. The method of the present invention in particular is found to produce a beverage with a good balance in sweetness, fruitiness, and spice, providing a special flavor profile with minimal off-flavor notes, which renders the final beverage very drinkable and enjoyable.

The present invention furthermore is concerned with a fermented beverage, particularly a beer or beer-like beverage, with an ethanol content of between 0.0% and 1.0% by volume, which fermented beverage is obtained by a method according to the present invention or which fermented beverage is obtainable by a method according to the present invention.

In particular the present invention is concerned with a fermented beverage, particularly a beer or beer-like beverage, with an ethanol content of between 0.0% and 1.0% by volume, comprising:

4VG in an amount of between 0.3-2.0 ppm, preferably between 0.5-1.0 ppm; and isoamyl acetate in an amount of between 2.0-14.0 ppm; and optionally one or more of:

ethyl acetate in an amount of between 40.0-80.0 ppm vanillin.

The present invention additionally concerns a concentrated flavor composition for use in producing a fermented beverage, particularly a beer or beer-like beverage, with an ethanol content of between 0.0% and 1.0% by volume, which flavor composition particularly may be used in a method according to the invention to add flavor to a fermented base beverage with reduced ethanol content to produce the fermented beverage, the flavor composition comprising 4VG and one or both of isoamyl acetate and ethyl acetate, and optionally further comprising vanillin.

DETAILED DESCRIPTION

The invention discloses a method for producing a zero or low alcohol fermented beverage, comprising providing an ethanol containing fermented base beverage, reducing the ethanol content of the fermented base beverage by a de-alcoholisation step, followed by adding flavor to the fermented base beverage with reduced ethanol content to produce the fermented beverage, wherein the added flavor includes at least an amount of 4-vinyl guaiacol (4VG).

In the present text, "zero or low alcohol beverage" is a beverage having an ethanol content of 1.0 vol. % ("ABV") or less, preferably 0.5 vol. % or less, more preferably 0.2 vol. % or less. Such beverages will be called NA beverages. Thus, NA beverage is a beverage having an ethanol content of 0-1.0 vol. %, such as preferably 0-0.5 vol. %. The NA beverage preferably is a NA beer or NA beer-like beverage.

In the present context, beer is to be understood in a broad sense, that is, beer may refer to any type of beer, including but not limited to ale, porter, stout, lager and bock beer. Beer is preferably a malt-based beer, that is, a beer prepared from the fermentation of wort prepared from (among others) malt. An NA beer or NA beer-like beverage is a beer in this context having an ethanol content of 1.0 vol. % ("ABV") or less, preferably 0.5 vol. % or less, more preferably 0.2 vol. % or less as described above. It is a purpose of the invention to provide an NA beer or NA beer-like beverage which has the taste and drinkability of or similar to a regular beer.

In the method according to the invention 4VG may for example be added as a concentrated flavor composition to the fermented base beverage with reduced ethanol content in order to produce the final fermented beverage with a concentration of 4VG as desired. A suitable dilution factor of the flavor composition to mix with the base beverage can be readily determined in dependence on the actual 4VG concentration strength of the flavor composition used and the desired 4VG concentration in the final beverage.

In a preferred embodiment of the method of the present invention the 4VG is added in an amount of between 0.2-2.0 ppm (mg/L), preferably between 0.5-1.0 ppm. Thus an amount of 4VG added to the base beverage is such that the final beverage has 0.2-2.0 ppm (mg/L), preferably between 0.5-1.0 ppm of 4VG more than the amount of 4VG in the used fermented base beverage. If for example there is no residual 4VG present in the used de-alcoholised base beverage the addition of 4VG according to the present invention results in a concentration of 4VG in the final beverage after addition of 4VG of 0.2-2.0 ppm (mg/L), preferably between 0.5-1.0 ppm. If instead the used de-alcoholised base beverage comprises some residual 4VG the addition of 4VG according to the present invention results in a concentration of 4VG in the final beverage after addition of 4VG of 0.2-2.0 ppm (mg/L), preferably between 0.5-1.0 ppm, above the residual concentration of 4VG in the base beverage. Whether the used base beverage after de-alcoholisation has any remaining or residual amount of 4VG, and in what amount, can be determined by conventional means and techniques available to the skilled person. Optionally the method of the present invention can comprise such determination of the amount of 4VG present in the base beverage after de-alcoholisation prior to addition of 4VG in order to adjust the amount of 4VG to be added in dependence of the determined amount.

The addition of 4VG of 0.2 ppm or above renders the final beverage to have a noticeable less 'flat' flavor than the de-alcoholised fermented base beverage. An addition of 4VG above 2 ppm renders the final beverage in most cases to deteriorate in taste and drinkability. Addition of 4VG of 0.5 ppm-1.0 ppm has been found to provide a preferred balance in flavor improvement with minimal off-flavor notes in the final beverage in most de-alcoholised fermented base beverage.

In accordance herewith, in a further preferred embodiment of the method of the present invention the total amount of 4VG in the produced fermented beverage is between 0.3-2.0 ppm, preferably between 0.5-1.0 ppm. Although addition of 4VG of 0.2 ppm or above renders the final beverage to have a noticeable less 'flat' flavor than the de-alcoholised fermented base beverage as described herein, it is particularly preferred that the amount of 4VG added is such that the final beverage has a concentration of 4VG of at least 0.3 ppm, as this renders the final beverage to have detectable 'spicy' 4VG flavor notes. A concentration of 4VG in the final beverage of between 0.5-1.0 ppm particularly renders the 4VG flavour notes well recognizable and provides a special flavor profile with minimal off-flavor notes, which renders the final beverage very drinkable and enjoyable.

A particular embodiment of the method of the present invention comprises that the added flavor also includes an amount of isoamyl acetate. Addition of an amount of isoamyl acetate improves the taste of the final beverage even further, in particular with respect to generally appreciated fruity flavors, and importantly supplements the 4VG flavor addition as any possible undesirable medicinal, off-flavor note caused by 4VG is effectively masked by the isoamyl acetate, e.g. such that any otherwise possible remaining off-flavor notes in the beverage are unnoticeable in the final beverage. Best results have been found when the final beverage has a concentration of isoamyl acetate between 2.0-14.0 ppm.

Accordingly, in a preferred embodiment of the method of the present invention the isoamyl acetate is added in an amount of between 2.0-14.0 ppm.

A particular embodiment of the method of the present invention comprises that the added flavor includes an amount of ethyl acetate. Similar to isoamyl acetate as described herein above, ethyl acetate is effective in masking any possible undesirable medicinal, off-flavor notes caused by 4VG while at the same time improving the taste of the final beverage, particularly in view of fruitiness. Best results have been found when the final beverage has a concentration of ethyl acetate between 2.0-14.0 ppm As such in a further preferred embodiment of the method of the present invention the ethyl acetate is added in an amount of between 40.0-80.0 ppm.

Very good results are thus achieved with the method of the present invention when in addition to 4VG also an amount of isoamyl acetate or ethyl acetate is added to the used base beverage. Particularly good results have been obtained when in addition to 4VG an amount of isoamyl acetate as well as an amount of ethyl acetate is added to the used base beverage.

In addition to the 4VG and optionally one or more of isoamyl acetate and ethyl acetate as described in the foregoing, it has been found that adding vanillin as a flavoring to the base beverage provides the final beverage with an optimal balance in sweetness, fruitiness, and spice, resulting in the best results. As such, a further preferred embodiment of the method of the present invention comprises that the added flavor includes an amount of vanillin.

The present invention further discloses to a concentrated flavor composition for use in producing a fermented beverage, particularly a beer or beer-like beverage, with an ethanol content of between 0.0% and 1.0% by volume, particularly in a method according to any one of the foregoing claims, the flavor composition comprising 4VG and one or both of isoamyl acetate and ethyl acetate, and optionally further comprising vanillin.

Use of a concentrated flavor composition of the present invention for producing a fermented beverage, particularly a beer or beer-like beverage, with an ethanol content of between 0.0% and 1.0% by volume, is also disclosed herein.

Moreover disclosed by the present invention is a fermented beverage, particularly a beer or beer-like beverage, with an ethanol content of between 0.0% and 1.0% by volume, obtainable by a method according to the present invention.

The present invention in particular discloses a fermented beverage, particularly a beer or beer-like beverage, with an ethanol content of between 0.0% and 1.0% by volume, comprising:

4VG in an amount of between 0.3 -2.0 ppm, preferably between 0.5-1.0 ppm; and isoamyl acetate in an amount of between 6.0-14.0 ppm; and optionally one or more of:

ethyl acetate in an amount of between 40.0-80.0 ppm, vanillin.

In a preferred embodiment of the fermented beverage of the present invention the fermented beverage is a top-fermented NA beer or NA beer-like beverage.

It will be appreciated that the scope of the invention may include embodiments having combinations of all or some of the features described.

The word 'comprising' as used herein does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various values, concentrations and amounts disclosed in the description may be modified unless otherwise indicated and that various embodiments disclosed and/or claimed may be combined without departing from the scope of the invention.

The invention claimed is:

1. A method of producing a top-fermented beer or a top-fermented beer-like beverage, with an ethanol content of between 0.0% and 1.0% by volume, comprising providing an ethanol containing top-fermented base beverage, reducing the ethanol content of the top-fermented base beverage by a de-alcoholisation step, followed by adding flavor to the top-fermented base beverage with reduced ethanol content to produce the fermented beverage, wherein the added flavor includes at least an amount of 4-vinyl guaiacol (4VG), and wherein the added flavor further comprises at least one of ethyl acetate and isoamyl acetate.

2. The method according to claim 1, wherein 4VG is added in an amount of between 0.2-2.0 ppm.

3. The method according to claim 1, wherein the total amount of 4VG in the produced fermented beverage after addition of 4VG is between 0.3-2.0 ppm.

4. The method according to claim 1, wherein the added flavor includes an amount of isoamyl acetate.

5. The method according to claim 1, wherein the isoamyl acetate is added in an amount of between 2.0-14.0 ppm.

6. The method according to claim 1, wherein the added flavor includes an amount of ethyl acetate.

7. The method according to claim 1, wherein the ethyl acetate is added in an amount of between 40.0-80.0 ppm.

8. The method according to claim 1, wherein the added flavor includes an amount of vanillin.

9. The method according to claim 3, wherein the total amount of 4VG in the produced fermented beverage after addition of 4VG is between 0.5-1.0 ppm.

10. The method of claim 1, wherein the isoamyl acetate is added to the top-fermented base beverage in an effective amount to mask any possible undesirable off-flavor note caused by the 4VG.

11. The method of claim 1, wherein the ethyl acetate is added to the top-fermented base beverage in an effective amount to mask any possible undesirable off-flavor note caused by the 4VG.

12. The method of claim 1, wherein the top-fermented base beverage comprises 4VG in an amount of between 0.3-2.0 ppm and isoamyl acetate in an amount of between 2.0-14.0 ppm.

13. The method of claim 1 wherein the top-fermented base beverage comprises 4VG in an amount of between 0.3-2.0 ppm, isoamyl acetate in an amount of between 2.0-14.0 ppm, and ethyl acetate in an amount of between 40.0-80.0 ppm.

* * * * *